(12) United States Patent
Nelson et al.

(10) Patent No.: US 7,309,103 B2
(45) Date of Patent: Dec. 18, 2007

(54) VEHICLE PASSENGER SEAT WITH TEAR-AWAY UPHOLSTERY COVER

(75) Inventors: Erik K. Nelson, Woodburn, IN (US); Thomas R. Graham, Fort Wayne, IN (US); Brian M. Shaklik, Leo, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 406 days.

(21) Appl. No.: 11/128,694

(22) Filed: May 12, 2005

(65) Prior Publication Data

US 2006/0255633 A1    Nov. 16, 2006

(51) Int. Cl.
*B60N 2/42* (2006.01)

(52) U.S. Cl. .............................. 297/216.13; 297/216.14

(58) Field of Classification Search .......... 297/216.13, 297/216.14
See application file for complete search history.

(56) References Cited

U.S. PATENT DOCUMENTS

| | | | | |
|---|---|---|---|---|
| 5,022,878 A | * | 6/1991 | Casad ........................ 441/103 |
| 5,468,045 A | * | 11/1995 | Weber .................... 297/216.11 |
| 6,123,388 A | * | 9/2000 | Vits et al. .............. 297/216.13 |
| 6,485,098 B1 | | 11/2002 | Vits et al. |
| 6,585,289 B1 | * | 7/2003 | Hammer et al. ............ 280/733 |
| 6,793,240 B2 | * | 9/2004 | Daines et al. ............... 280/729 |
| 7,077,472 B2 | * | 7/2006 | Steffens, Jr. ........... 297/216.13 |

* cited by examiner

*Primary Examiner*—Sarah B. McPartlin
(74) *Attorney, Agent, or Firm*—Jeffrey P. Calfa; Gerald W. Askew

(57) ABSTRACT

A vehicle passenger seat with an upholstery cover having a fabric seam designed to absorb energy from a seat occupant upon impact. Means for progressively absorbing energy from the seat belt occupant are disclosed. Use of the fabric seam to absorb vehicle passenger seat occupant energy increases the survivability of an impact for an occupant of a seat with a separate inner and outer seat frame, and relates to compliance with energy absorption requirements for seat-backs of 49 C.F.R. Section 571.222 (FMVSS 222) and seat belt anchorage loading strength requirements of 49 C.F.R. Section 571.209 and 571.210 (FMVSS 209 and FMVSS 210).

3 Claims, 11 Drawing Sheets

VEHICLE PASSENGER SEAT HAVING AN INNER AND OUTER FRAME, WITH A TEARABLE FABRIC SEAM SEPARATED

FIG. 1
MULTI-PASSENGER VEHICLE

FIG. 2
PASSENGER SEAT WITH SEPARATE INNER AND OUTER UPHOLSTERY COVERS

FIG. 3
MULTI-PASSENGER VEHICLE WITH SEATS
HAVING INNER AND OUTER FRAMES
PERFORMING ENERGY ABSORBING FUNCTION

FIG. 4
VEHICLE PASSENGER SEAT HAVING AN INNER AND AN OUTER FRAME AND A SINGLE UPHOLSTERY COVER WITH A TEARABLE FABRIC SEAM

FIG. 5
VEHICLE PASSENGER SEAT HAVING
AN INNER AND OUTER FRAME, WITH
A TEARABLE FABRIC SEAM SEPARATED

FIG. 6
VEHICLE PASSENGER SEAT HAVING
A TEARABLE FABRIC SEAM WITH
A PROGRESSIVE NUMBER OF THREADS

FIG. 7
VEHICLE PASSENGER SEAT HAVING
AN INNER SEAT BACK FRAME HAVING
A SEGMENT PROXIMATE TO THE SEAT
BACK FORWARD SURFACE

FIG. 8
CROSS-SECTIONAL VIEW OF VEHICLE PASSENGER SEAT HAVING UPHOLSTERY COVER WITH TEARABLE FABRIC SEAM AND BELLOWS-FOLDS

FIG. 9

CROSS-SECTIONAL VIEW OF VEHICLE PASSENGER SEAT HAVING UPHOLSTERY COVER WITH TEARABLE FABRIC SEAT AND DEEP FOLD

FIG. 10
VEHICLE PASSENGER SEAT UPHOLSTERY COVER WITH DEEP FOLD AND V-SHAPED TEARABLE FABRIC SEAM

FIG. 11
VEHICLE PASSENGER SEAT HAVING A TEARABLE FABRIC SEAM AT PROGRESSIVE ANGLE & DISTANCE

VEHICLE PASSENGER SEAT WITH TEAR-AWAY UPHOLSTERY COVER

BACKGROUND OF INVENTION

This invention relates to a vehicle passenger seat having an inner frame and an outer frame, which inner frame and outer frame are intended to perform separate energy absorbing functions in the event of an impact, and a single upholstery cover compatible with the inner and outer frames, which upholstery cover is provided with a fabric seam that is intended to absorb additional energy upon separation. Specifically, it is intended to complement a vehicle passenger seat of a type known in the industry, and provide a cost-efficient means of improving the energy absorbing characteristics thereof.

Designers of vehicles used to transport multiple passengers, particularly passengers who are minors, are posed with a unique challenge. Multitudes of passengers, especially minors, cannot be relied upon to securely fasten seat belts, or to refrain from unbuckling them once they are buckled. In order to compensate for this, and to ensure that passengers are restrained in the event of an impact, designers of these vehicles have adopted the practice of "compartmentalization". The practice of "compartmentalization" is based upon providing only a small distance between the seated passenger and the seat-back directly in front of him or her, wherein that person can develop only a limited velocity relative to the rapidly decelerating vehicle. Further, the practice also depends upon providing a seat-back that can absorb the inertial energy of that person without injury to him or her. The National Highway Traffic Safety Administration, DOT (NHTSA) has codified this practice into 49 C.F.R. Section 571.222 (FMVSS 222), which sets forth the requirement that the rear side of the seat provide an impact barrier in which the seat-back bends or deforms when subjected to the force of occupants impacting it during a deceleration event. The rate, force, and maximum amount of deflection required are set forth in that title.

The code applicable to school busses at this time does not require the use of any sort of active restraint such as a two-point passenger restraining lap belt or a three-point passenger restraining lap belt and torso harness combination. Yet there is a demand for active restraints by certain customers and organizations. In order to accommodate this demand, manufacturers of school busses have begun to offer both types. The addition of three-point passenger restraining lap belt and torso harness combinations to passenger seats designed to meet the requirements of 49 C.F.R. Section 571.222 (FMVSS 222) has special implications for the ability of that passenger seat-back to absorb energy. Specifically, the requirements for passenger seats having three-point passenger restraining lap belt and torso harness combinations are set forth in 49 C.F.R. Sections 571.209 and 571.210 (FMVSS 209 and FMVSS 210). That title sets forth a test procedure and requirements for a minimum loading strength of the three-point passenger restraining lap belt and torso harness combination, as well as for the anchorage points thereof.

The difficulty lies in meeting both the energy absorption requirements for the seat-back of 49 C.F.R. Section 571.222 (FMVSS 222) and the seat belt anchorage loading strength requirements of 49 C.F.R. Section 571.209 and 571.210 (FMVSS 209 and FMVSS 210). This difficulty is most pronounced in the scenario wherein a seat occupant is buckled into a three-point passenger restraining lap belt and torso harness combination, and the occupant of the seat immediately behind him or her is not buckled in. The solution increasingly employed by manufacturers of such school busses, utilizes a passenger seat with an inner and an outer frame. The inner frame is designed to articulate forward a certain amount under the initial loading of the passenger belted into the seat, before resisting further forward movement. The outer frame remains in its initial position, until the unbelted passenger in the seat immediately to the rear impacts it, at which time it performs its energy absorbing function. Such seat designs are not new, and are set forth in patents such as U.S. Pat. Nos. 6,123,388 and 6,485,098.

In order to accommodate the relative movement between the inner and outer seat frames in the event of an impact, the passenger seat in question is typically provided with separate upholstery covers and padding for each section, both inner and outer. This means that the seat has a crevice where the two sections abut, which encourages vandalism and tampering by passengers, especially by minors. Further, it means that when seat upholstery becomes torn or cut, the seat must be at least partially disassembled in order to replace the upholstery.

Previous to the invention disclosed herein, the inner frame of a passenger seat having an inner and outer frame was not designed to absorb energy during the duration of its articulation, other than a singular event, such as the separation of a frangible member, whereby the inner frame initially separated from the outer frame. This event was based on the initial impact of the seat occupant against the three-point passenger restraining lap belt and torso harness combination. Commonly, no separation event was employed at all, relying rather upon the seat cushion to locate the inner frame in its unarticulated position, and only engaging to significantly resist forward movement at the limit of articulation.

SUMMARY

One embodiment of the present invention is a vehicle passenger seat having an inner and an outer frame, which inner and outer frames are intended to perform separate energy absorbing functions in the event of an impact, and a single upholstery cover compatible with the inner and outer frames, which upholstery cover is provided with a fabric seam that is intended to absorb additional energy upon separation. The fabric seam is located at or near the boundary between the cushion attached to the inner frame and the cushion attached to the outer frame. It is so designed and stitched that it separates upon application of a known force. The value of the force of separation is such that the outer frame retains sufficient deformation characteristics to enable it to meet the requirements of 49 C.F.R. Section 571.222 (FMVSS 222) upon subsequent impact of the passengers seated immediately to the rear.

Another embodiment of the present invention employs a passenger seat substantially similar to the aforementioned embodiment, having an inner and outer frame intended to perform separate energy absorbing functions. The single upholstery cover is again provided with a fabric seam that is intended to absorb additional energy upon separation. The fabric seam is so stitched that the number of threads connecting the fabric pieces varies along the length of the seam. This variation is controlled in such a way that separation occurs progressively under application of an increasing amount of pressure. In this way, the tearing of the seam absorbs energy from the seat occupant in a controlled manner, thereby increasing impact survivability and ensuring that the seat-back outer frame retains sufficient deformation characteristics to enable it to meet the requirements of 49 C.F.R. Section 571.222 (FMVSS 222).

Yet another embodiment of the invention accomplishes the progressive separation of the fabric seam in another way. Specifically, the inner frame is so shaped that a portion of it is closer in proximity of depth to the forward surface of the seat-back. Upon impact, the inner frame is loaded by the seat belt anchorages, and begins to articulate forward. The portion of the frame closer in proximity of depth to the forward surface causes the seam to begin to rupture at that point first. As the inner frame continues to articulate forward, the inner frame is shaped to load and tear the seam in a progressive manner. Again, the tearing of the seam absorbs energy from the seat occupants in a controlled manner.

Another embodiment of the invention involves a single upholstery cover over the inner and outer seat frame, which upholstery cover is provided with a specialized bellows-type seam. The bellows-type seam is fully encapsulated, and generally presents the appearance of a conventional upholstery seam. Behind the primary seam, and folded into a cavity between the seat frames, is a series of folds of fabric, which folds are sewn together. Upon impact and articulation of the passenger seat inner frame, the primary seam ruptures, and the underlying bellows are placed under tension. The threads of the seams connecting the folds of the bellows are stitched in a similar controlled manner, so that they separate progressively, thereby accomplishing the continuous absorption of energy from the seat occupant that is desired.

A variation of the bellows-type seam is one wherein a single deep fold is employed, with rows of seams of known strength along the depth of the fold. Following the rupture of the primary seam, the rows of seams along the depth of the fold separate progressively as the inner seat frame articulates. A further variation of the bellows-type seam is one in which a single deep fold is employed, with a primary seam and a secondary seam. The secondary seam is sewn in a shallow V-shape, such that the point of the "V" is forced to separate first, with the remainder of the secondary seam separating progressively.

Another embodiment of the invention involves a single upholstery cover over the inner and outer seat frames, which single upholstery cover is again provided with a fabric seam that is intended to absorb additional energy upon separation. The seam is located at or near the boundary between the cushion attached to the inner frame and the cushion attached to the outer frame along at least a portion of its length. The seam is so constructed that it varies along its length in distance from and angle to the boundary between the inner and outer frames. In this way, the seam ruptures first at the point nearest that boundary, and progressively separates along its length. As the rupture of the seam becomes more distant from the articulating inner frame, the amount of additional travel provided by the progressing separation of the seam diminishes. In this way, the amount of resistance to articulation of the inner frame provided by the upholstery cover increases progressively.

Each of the aforementioned embodiments are primarily concerned with utilizing the tearing of a seam of an upholstery cover of a seat, having inner and outer frames, to absorb energy from seat occupants in a controlled manner, thereby increasing impact survivability and ensuring that the seat-back outer frame retains sufficient deformation characteristics to enable it to meet the requirements of 49 C.F.R. Section 571.222 (FMVSS 222). The invention as presented is a solution to the problem of absorbing energy in a continuous manner over the articulation range of the inner seat frame. It may be used in conjunction with an inner frame that is initially restrained by a frangible member, or it may be used without such frangible member.

The figures listed illustrate the various embodiments of the vehicle passenger seat having inner and outer seat frames and a tear-away upholstery cover with a seam designed to absorb at least a portion of the occupants inertial energy upon impact and separation. Various versions of single and multiple seam designs are presented, with geometries designed to improvedly control the rate and force of separation.

DRAWINGS

FIG. 1—A multi-passenger vehicle
FIG. 2—A view of a passenger vehicle seat having separate inner and outer seat frames, and separate inner and outer upholstery covers
FIG. 3—A view of a passenger vehicle with seats having separate inner and outer seat frames, the passenger vehicle seats performing energy absorbing functions during an impact event.

DETAILED DESCRIPTION

Figure 1:
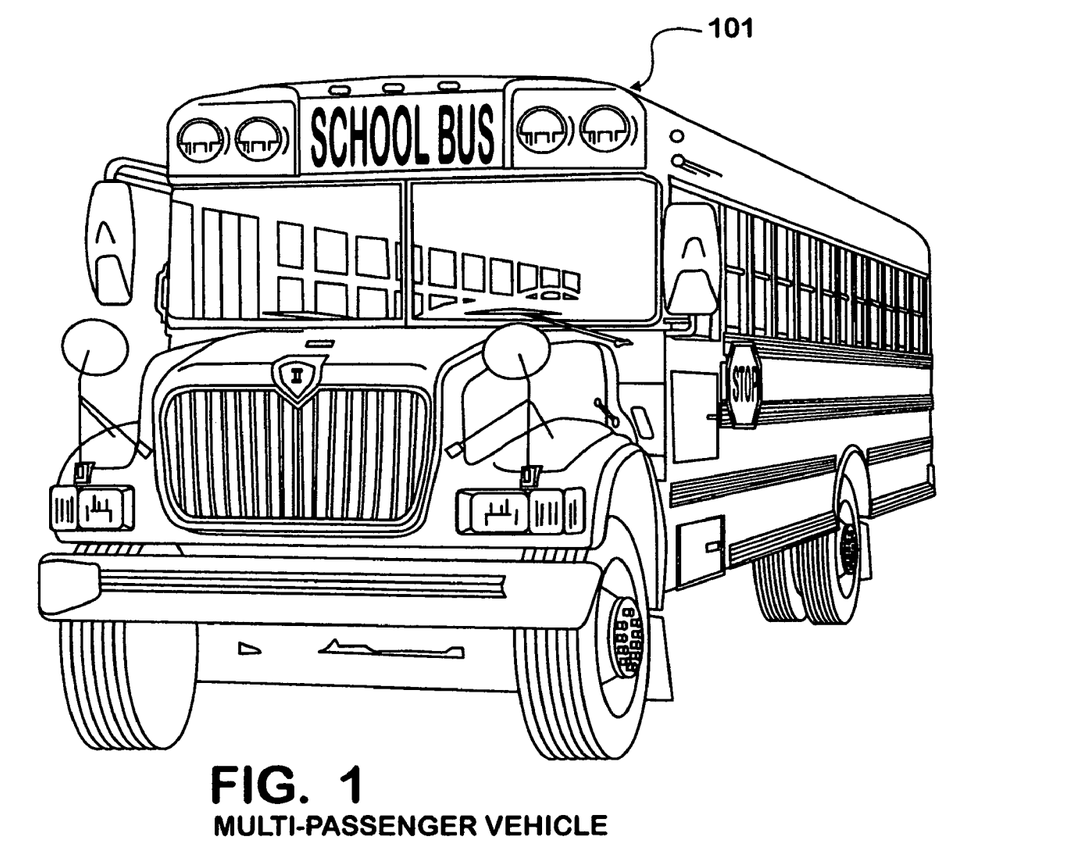

FIG. 1 shows a multi-passenger vehicle 101, of the type to which the invention may pertain.

Figure 2:
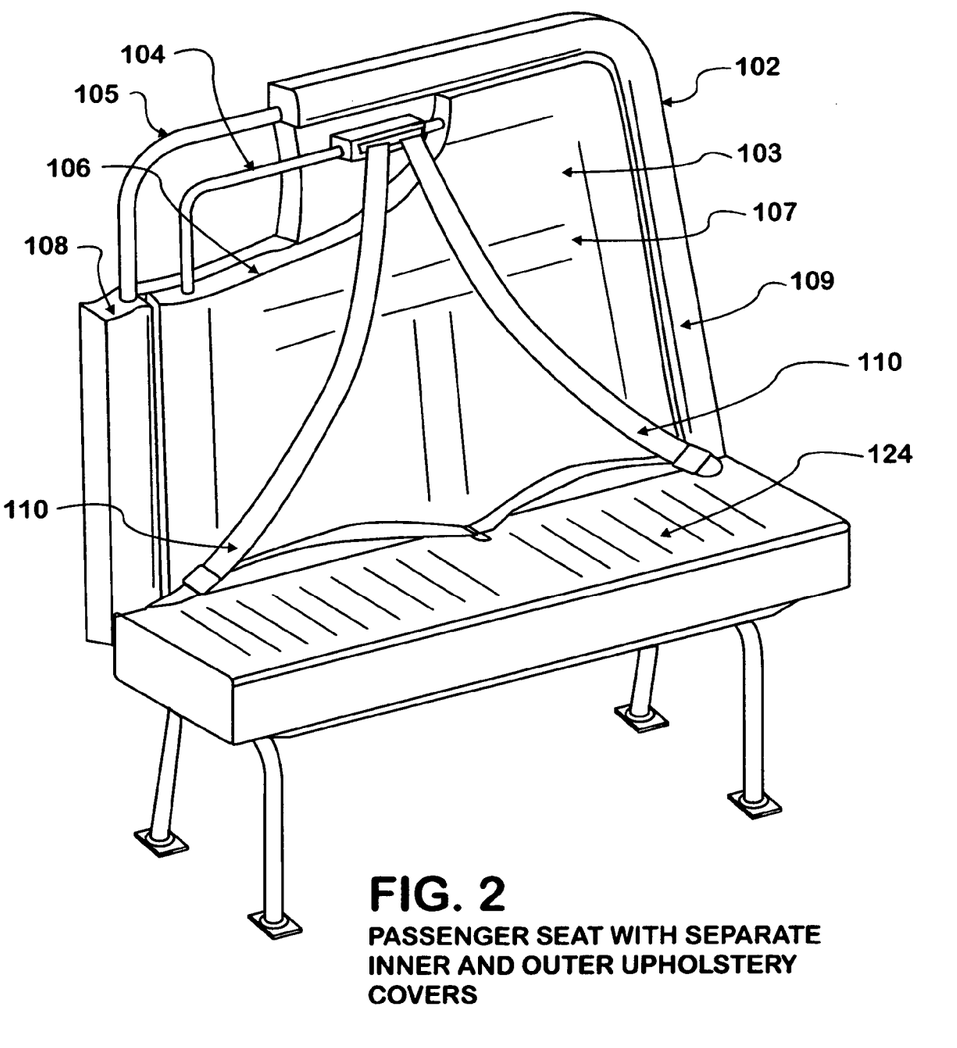

FIG. 2 shows a cutaway view of a vehicle passenger seat 102 having a seating surface 124 and a seat back 103, which seat back 103 is provided with an inner seat back frame 104 and an outer seat back frame 105. The inner seat back frame 104 is encased in an inner seat back cushion 106, and covered by a separate inner seat back upholstery cover 107. In the same way, the outer seat back frame 105 is encased in an outer seat back cushion 108, and covered by a separate outer seat back upholstery cover 109. The inner seat back frame 104 is attached to at least one three-point passenger restraining lap belt and torso harness combination 110.

Figure 3:
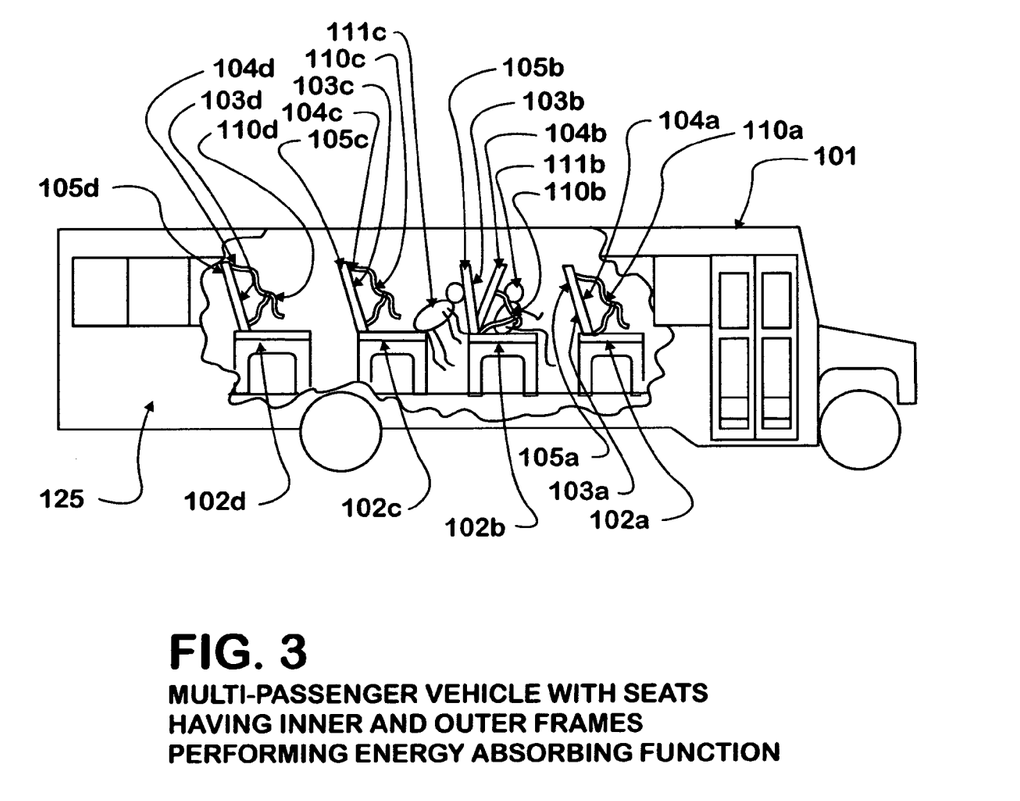

FIG. 3 shows a multi-passenger vehicle 101 having a vehicle body 125 and having vehicle passenger seats 102a, 102b, 102c, and 102d attached to the interior of the body 125. The vehicle passenger seats 102a, 102b, 102c, and 102d are equipped with seat backs 103a, 103b, 103c, and 103d, inner seat back frames 104a, 104b, 104c, and 104d, outer seat back frames 105a, 105b, 105c, and 105d, and three-point passenger restraining lap belt and torso harnesses 110a, 110b, 110c, and 110d as in FIG. 2. FIG. 3 further illustrates the energy-absorbing functions of the inner seat back frames 104 and outer seat back frames 105, by showing a passenger 111b seated in the vehicle passenger seat 102b, which passenger 111b is restrained by the three-point passenger restraining lap belt and torso harness 110b, which three-point passenger restraining lap belt and torso harness 110b is attached to inner seat back frame 104b, as well as a passenger 111c seated in the vehicle passenger seat 102c, which passenger 111c is not restrained by three-point passenger restraining lap belt and torso harness 110c. Rather, the passenger 111c has impacted the vehicle passenger seat back 103b, and is being prevented from further forward movement by the outer seat frame 105b of the vehicle passenger seat 102b.

Figure 4:
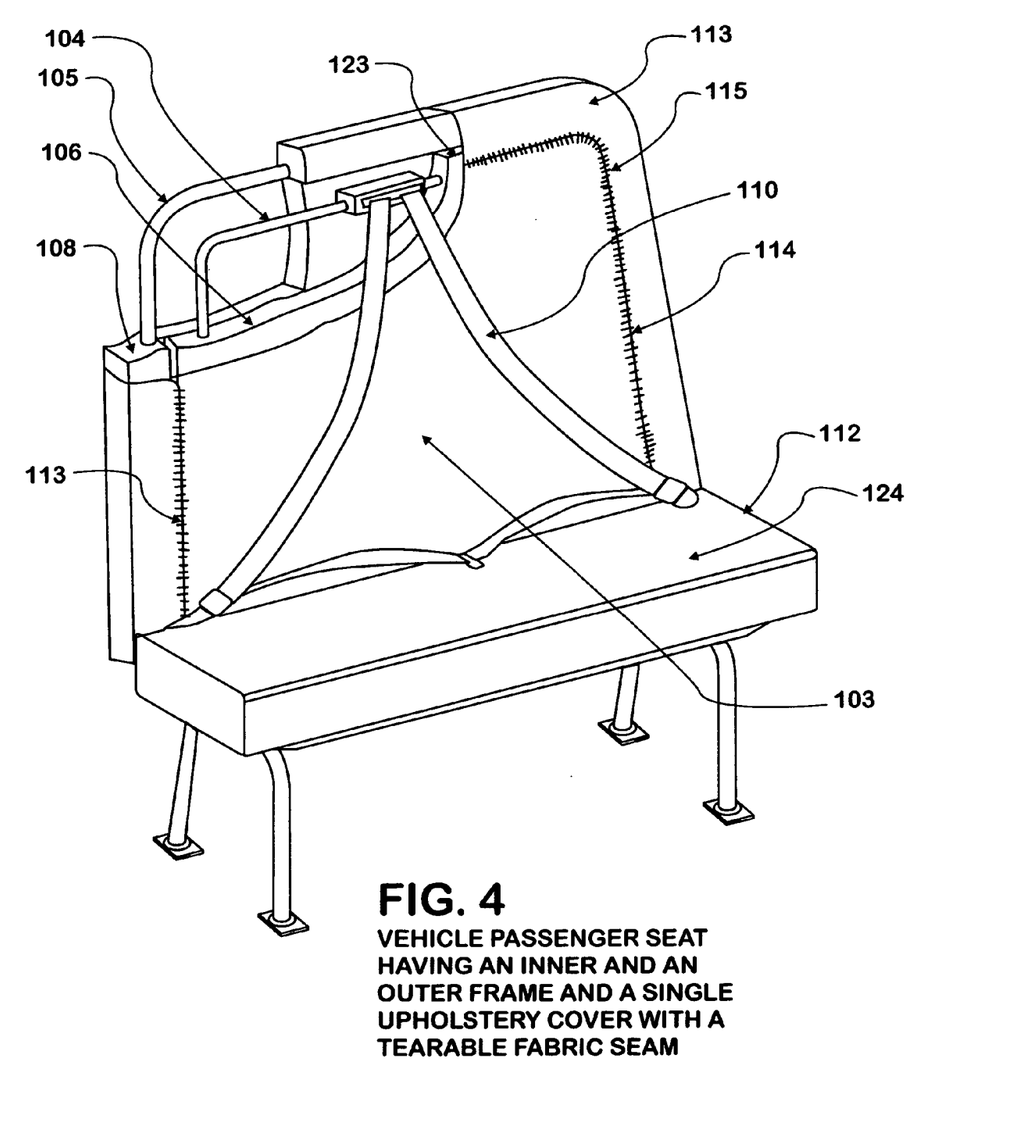
FIG. 4—A view of a first embodiment of the invention.

FIG. 4 shows a cutaway view of a vehicle passenger seat 112 having a seating surface 124 and a seat back 103, which seat back 103 has an inner seat back frame 104 and an outer seat back frame 105, similar to the passenger seat 102 in FIG. 2. The inner seat back frame 104 in FIG. 4 is again encased in an inner seat back cushion 106, and the outer seat back frame 105 is again encased in an outer seat back cushion 108. The vehicle passenger seat 112 is provided with a three-point passenger restraining lap belt and torso harness combination 110, which is attached to the inner seat back frame 104. A single seat back upholstery cover 113 encases the inner seat back cushion 106, the inner seat back frame 104, the outer seat back cushion 108, and the outer seat back frame 105. The single seat back upholstery cover 113 is fashioned with an energy-absorbing tearable fabric seam 114, located proximate to the boundary 123 where the inner seat back cushion 106 and the outer seat back cushion 108 abut. The energy-absorbing tearable fabric seam 114 is composed of threads 115 of known tensile strength, and is sewn in such a way that the force required to separate the energy-absorbing tearable fabric seam 114 is a known value.

Figure 5:
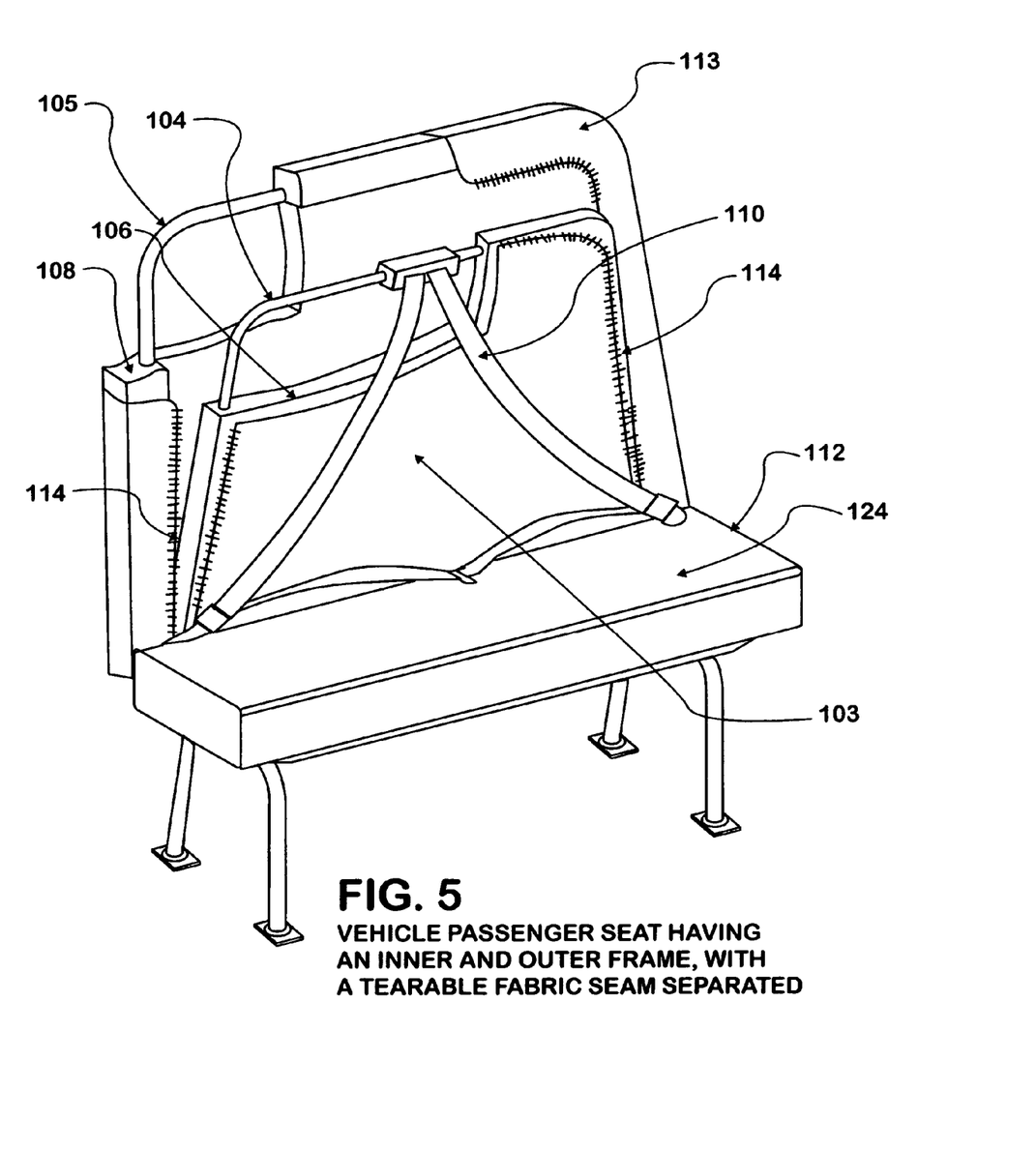
FIG. 5—A view of the first embodiment of the invention undergoing separation.

FIG. 5 shows a cutaway view of a passenger seat 112 similar to the passenger seat 112 shown in FIG. 4. The seat 112 in FIG. 5 again has a seating surface 124 and a seat back 103, an inner seat back frame 104, an outer seat back frame 105, an inner seat back cushion 106, and an outer seat back cushion 108. A three-point passenger restraining lap belt and torso harness combination 110 is attached to the inner seat back frame 104. The inner seat back frame 104 and inner seat back cushion 106 are shown articulated forward, as having been loaded by the three-point passenger restraining lap belt and torso harness combination 110 in the event of an impact. The energy-absorbing tearable fabric seam 114 of the single seat back upholstery cover 113 is shown asunder, having separated during impact and having absorbed part of the inertial energy of the passenger 111 (not shown) in doing so.

Figure 6:
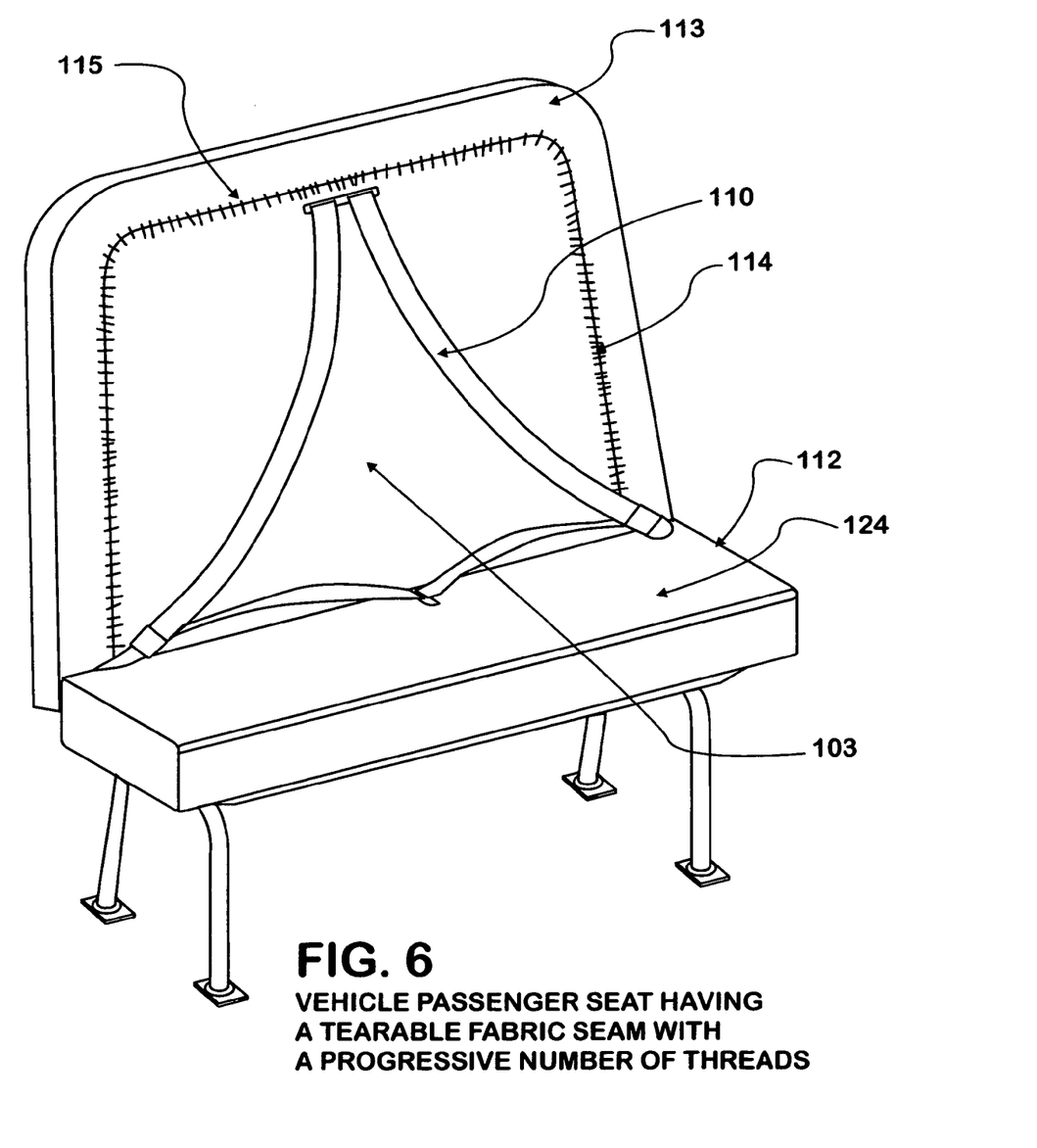
FIG. 6—A view of a second embodiment of the invention.

FIG. 6 shows a view of a passenger seat 112 with a seating surface 124 and a seat back 103 similar to the passenger seat shown in FIG. 4. The passenger seat 112 in FIG. 6 again has a single seat back upholstery cover 113 with an energy-absorbing tearable fabric seam 114. The fabric seam threads 115 are arranged such that they progress from a lesser number of threads per linear measurement to a greater number of threads per linear measurement along the length of the energy-absorbing tearable fabric seam 114. Typically, the lesser number of threads per linear measurement along the energy-absorbing tearable fabric seam 114 would be located near the point where the three-point passenger restraining lap belt and torso harness combination 110 is attached to the inner seat back frame 104 (not shown). In this way, the force necessary to separate the energy-absorbing tearable fabric seam 114 will increase as the inner seat back frame 104 articulates.

Figure 7:
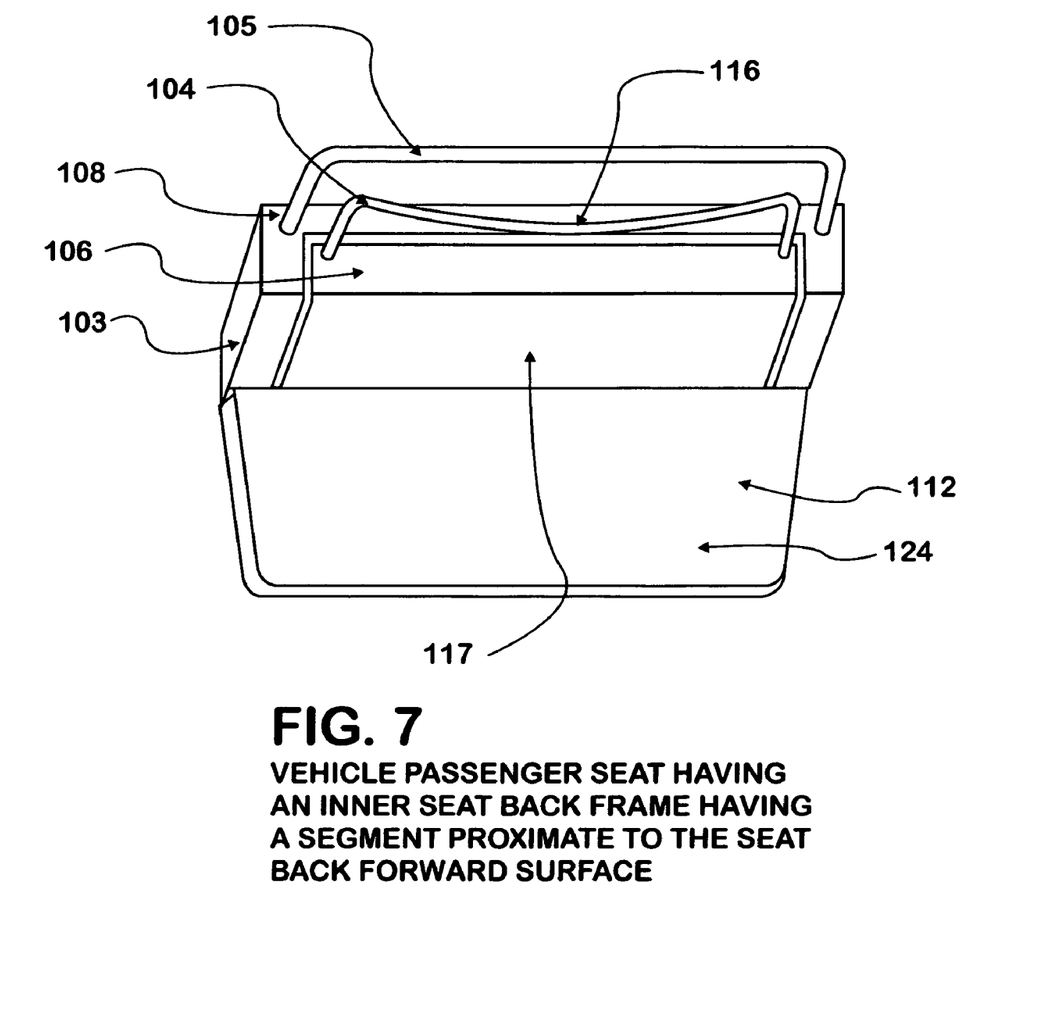
FIG. 7—A view of a third embodiment of the invention.

FIG. 7 shows a view of a passenger seat 112 having a seating surface 124 and a seat back 103 similar to the passenger seat 112 shown in FIG. 4. The passenger seat 112 in FIG. 7 has an inner seat back frame 104, an outer seat back frame 105, an inner seat back cushion 106, and an outer seat back cushion 108. The inner seat back cushion 106 and the outer seat back cushion 108 are both shown truncated, in order to reveal the form of the inner seat back frame 104 and the outer seat back frame 105. The inner seat back frame 104 is designed so that it has at least one segment 116 proximate to the forward surface 117 of seat back 103, and therefore is proximate to the energy-absorbing tearable fabric seam 114 (not shown). Because the inner seat back frame 104 is more rigid than the inner seat back cushion 106 that surrounds it, the at least one segment 116 proximate to the forward surface 117 of seat back 103, and to the energy-absorbing tearable fabric seam 114, penetrates the energy-absorbing tearable fabric seam 114 prior to the separation of the remainder of the energy-absorbing tearable fabric seam 114. In this way, the desired progressive separation of the energy-absorbing tearable fabric seam 114, and resulting controlled absorption of inertial energy of the passenger 111 (not shown), is achieved.

Figure 8:
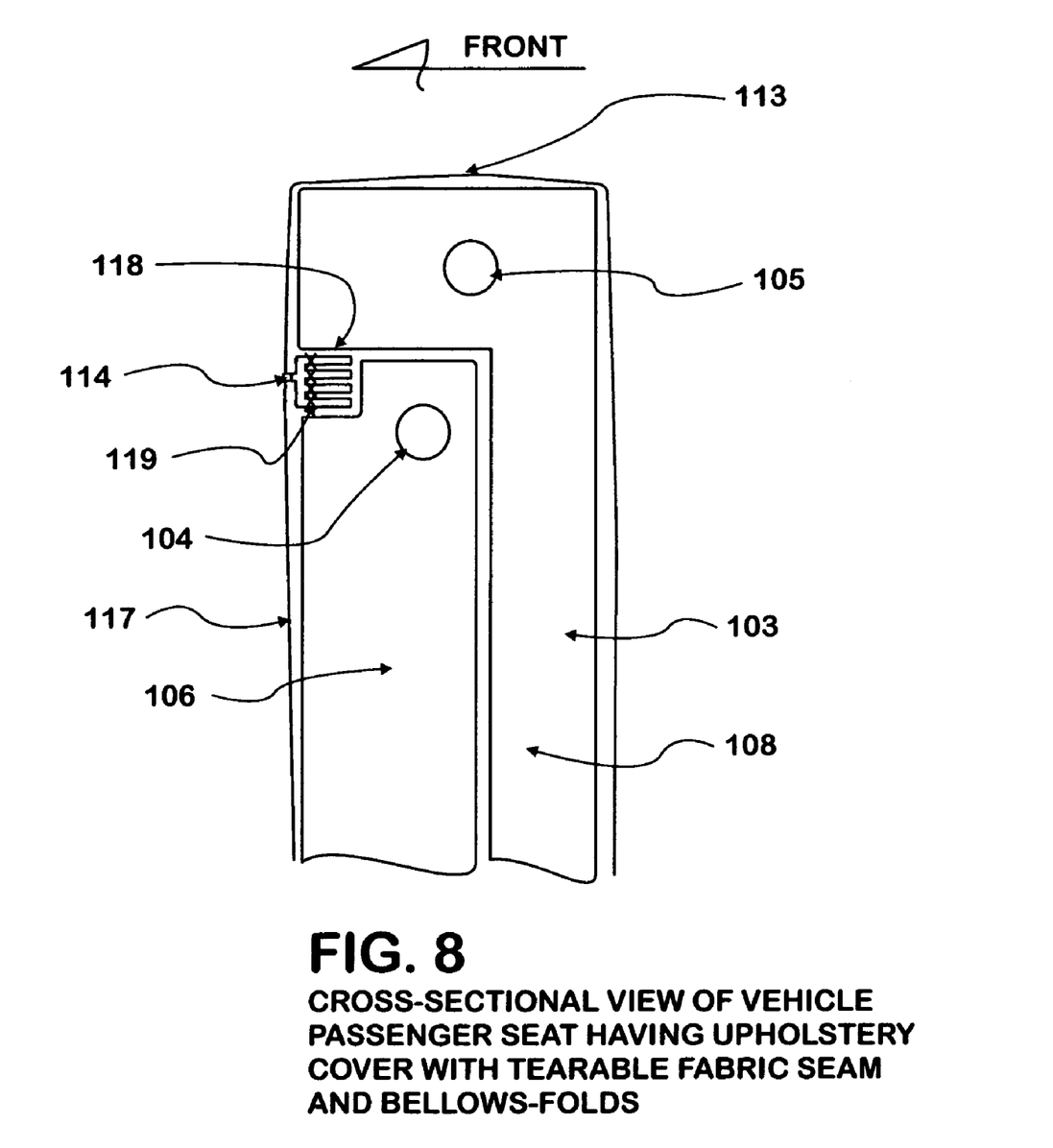
FIG. 8—A cross-sectional view of a fourth embodiment of the invention.

FIG. 8 shows a cross sectional view of the upper part of a seat back 103 having an inner seat back frame 104, an outer seat back frame 105, an inner seat back cushion 106, and an outer seat back cushion 108. The single seat back upholstery cover 113 is provided with a series of bellows-folds 118, which are concealed from the seat back forward surface 117 by the energy-absorbing tearable fabric seam 114. The bellows-folds 118 have secondary energy-absorbing tearable fabric seams 119 connecting the folds in such a way that the bellows-folds 118 are initially restrained from expanding subsequent to the separation of the primary energy-absorbing tearable fabric seam 114. As the inner seat back frame 104 continues to articulate forward, the secondary energy-absorbing tearable fabric seams 119 separate sequentially or randomly, progressively absorbing the inertial energy of the passenger 111 (not shown).

Figure 9:
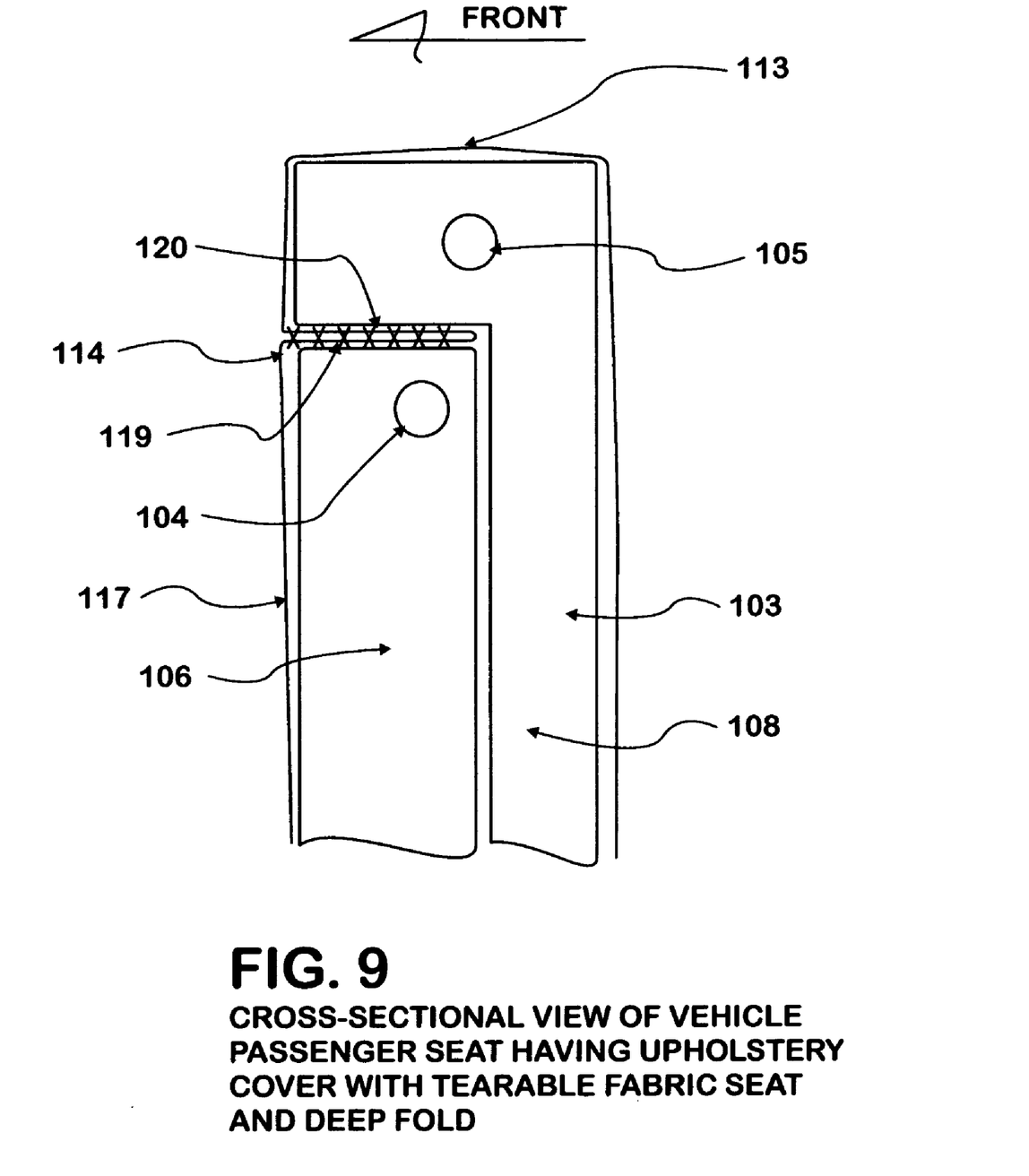
FIG. 9—A cross-sectional view of a fifth embodiment of the invention.

FIG. 9 shows a cross sectional view of the upper part of a seat back 103, similar to the cross sectional view of the upper part of the seat back 103 shown in FIG. 8. The upper part of the seat back 103 shown in FIG. 9 has an inner seat back frame 104, an outer seat back frame 105, an inner seat back cushion 106, and an outer seat back cushion 108. The single seat back upholstery cover 113 is provided with a single deep fold 120, which is concealed from the seat back forward surface 117 by the energy-absorbing tearable fabric seam 114. The single deep fold 120 has multiple secondary energy-absorbing tearable fabric seams 119 located progressively deeper along the depth of the single deep fold 120. These multiple secondary energy-absorbing tearable fabric seams 119 initially restrain the single deep fold 120 from extending subsequent to the separation of the primary energy-absorbing tearable fabric seam 114. As the inner seat back frame 104 continues to articulate forward, the secondary energy-absorbing tearable fabric seams 119 separate sequentially, progressively absorbing the inertial energy of the passenger 111 (not shown).

Figure 10:
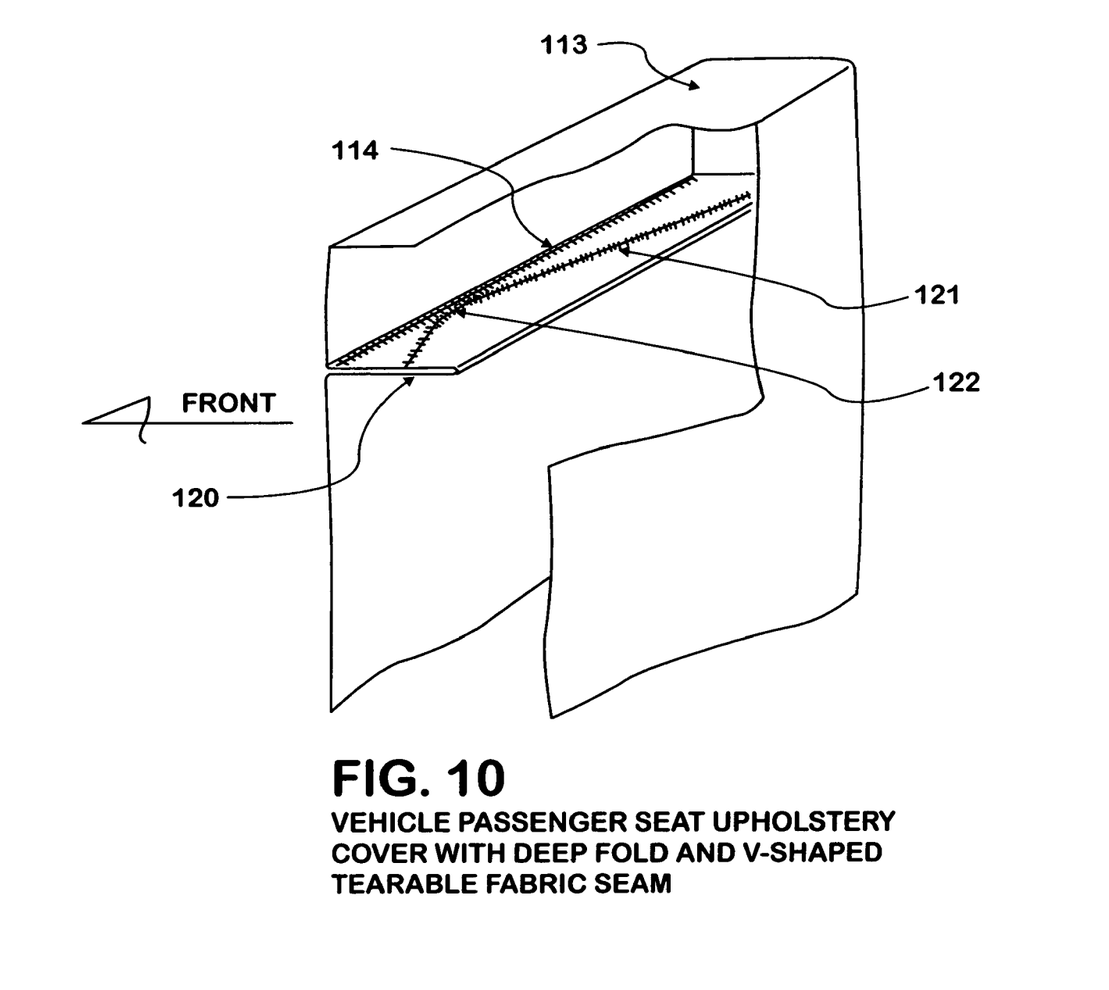
FIG. 10—A view of a sixth embodiment of the invention.

FIG. 10 shows a cutaway view of a single seat back upholstery cover 113 only, which single seat back upholstery cover 113 is provided with a single deep fold 120, similar to the single seat back upholstery cover 113 shown in FIG. 9. In lieu of the multiple energy-absorbing tearable fabric seams 119 shown in FIG. 9, the single deep fold 120 shown in FIG. 10 possesses a V-shaped secondary energy-absorbing tearable fabric seam 121. The V-shaped secondary energy-absorbing tearable fabric seam 121 initially engages to restrain the single deep fold 120 from extending at its apex 122 subsequent to the separation of the primary energy-absorbing tearable fabric seam 114. As the inner seat back frame 104 (not shown) continues to articulate forward, the V-shaped secondary energy-absorbing tearable fabric seam 121 separates, first at the apex 122, then progressively away from the apex 122 and deeper into the single deep fold 120.

In this way, the desired progressive separation of the V-shaped secondary energy-absorbing tearable fabric seam 121, and resulting controlled absorption of inertial energy of the passenger 111 (not shown), is achieved.

Figure 11:
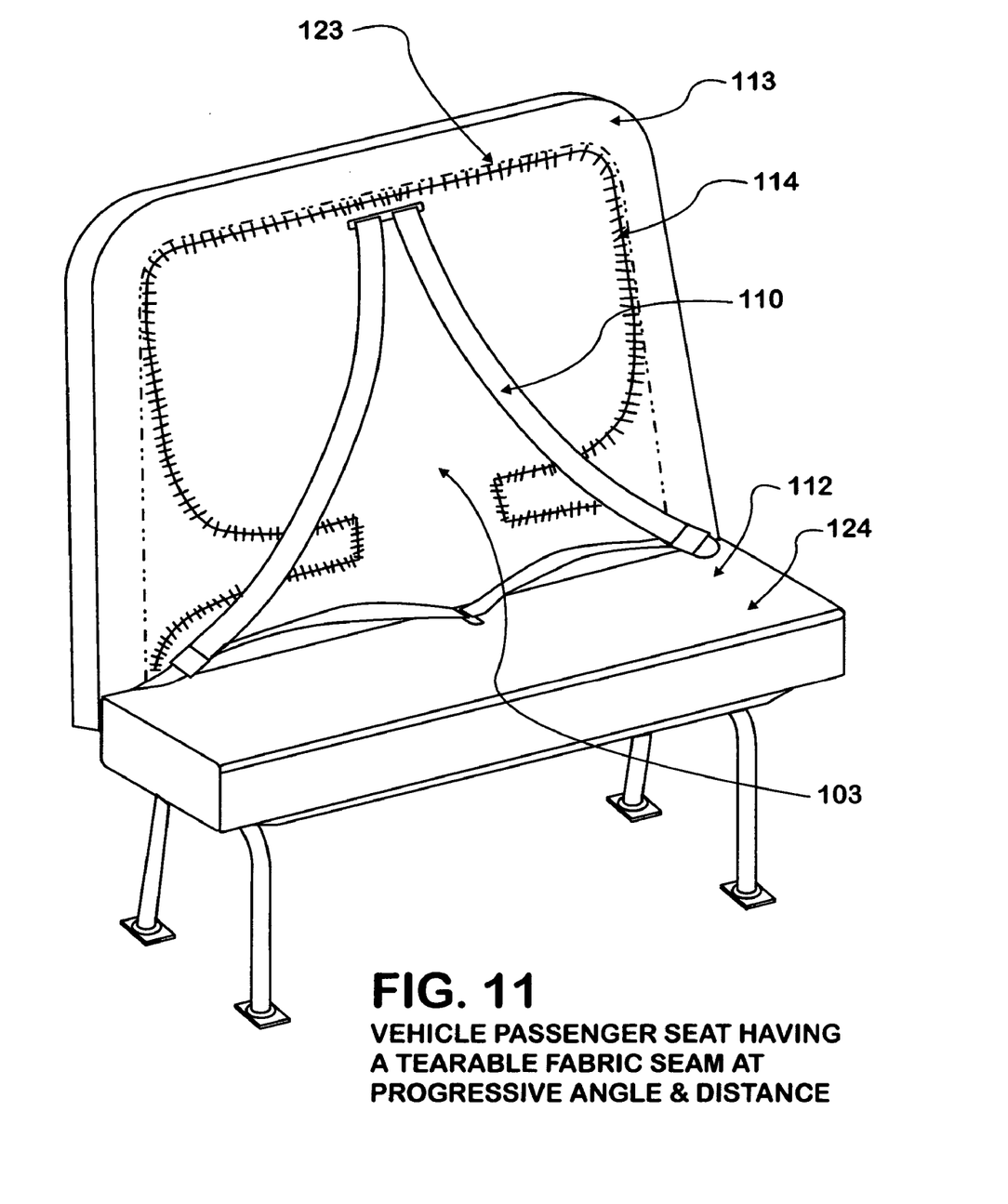
FIG. 11—A view of a seventh embodiment of the invention.

FIG. 11 shows a view of a passenger seat 112 with a seating surface 124 and a seat back 103 similar to the passenger seat shown in FIG. 4. The passenger seat 112 in FIG. 11 again has a single seat back upholstery cover 113 with an energy-absorbing tearable fabric seam 114. In the case of the energy-absorbing tearable fabric seam 114 in FIG. 11, it is located proximate to the boundary 123 where the inner seat back cushion 106 (not shown) and the outer seat back cushion 108 (not shown) abut, near the point where the three-point passenger restraining lap belt and torso harness combination 110 attaches to the inner seat back frame 104 (not shown). As the energy-absorbing tearable fabric seam 114 progresses along the boundary 123 between the inner seat back cushion 106 and the outer seat back cushion 108, the energy-absorbing tearable fabric seam 114 becomes more distant from, and at a greater angle to, the boundary 123. In this way, as separation of the energy-absorbing tearable fabric seam 114 progresses, starting at the attachment point of the three-point passenger restraining lap belt and torso harness combination 110 to the inner seat back frame 104, the force required to accomplish the separation increases.

Other permutations of the invention are possible without departing from the teachings disclosed herein, provided that the function of the invention is to use a fabric seam to absorb energy upon articulation of a portion of a vehicle passenger seat. Other advantages to a passenger seat equipped with an energy-absorbing fabric seam may also be inherent in the invention, without having been described above.

We claim:

1. A mobile vehicle passenger seat, comprising:
   a seating surface and a seat back, said seat back having a forward surface and a rearward surface, said seat back further having a first seat back frame, said first seat back frame having a mounting point for an upper portion of a seat belt, and said seat back further having a second seat back frame;
   an upholstery cover enveloping said seat back, said upholstery cover having a fabric seam, said fabric seam being separable upon articulation of said first seat back frame and said fabric seam functioning to absorb energy from a seat occupant upon separation; and
   said fabric seam is further comprised of stitching, said stitching progressively increasing in the number of connecting threads per given length of seam, the lesser number of connecting threads per given length of seam being near said mounting point of said upper portion of said seat belt upon said first seat back frame.

2. A mobile vehicle passenger seat, comprising:
   a seating surface and a seat back, said seat back having a forward surface and a rearward surface, said seat back further having a first seat back frame, said first seat back frame having a mounting point for an upper portion of a seat belt, and said seat back further having a second seat back frame;
   an upholstery cover enveloping said seat back, said upholstery cover having a fabric seam located substantially between said first seat back frame and said second seat back frame, said fabric seam being separable upon articulation of said first seat back frame, and said fabric seam functioning to absorb energy from a seat occupant upon separation; and
   said fabric seam is further comprised of stitching, said stitching progressively increasing in the number of connecting threads per given length of seam, the lesser number of connecting threads per given length of seam being near said mounting point of said upper portion of said seat belt upon said first seat back frame.

3. A mobile multi-passenger vehicle for operation on the ground, comprising:
   a vehicle body;
   at least one passenger seat attached to the interior of said vehicle body, said at least one passenger seat having a seating surface and a seat back, said seat back having a forward surface and a rearward surface, said seat back further having a first seat back frame, said first seat back frame having a mounting point for an upper portion of a seat belt, and said seat back further having a second seat back frame;
   an upholstery cover enveloping said seat back, said upholstery cover having a fabric seam, said fabric seam being separable upon articulation of said first seat back frame, and said fabric seam functioning to absorb energy from a seat occupant upon separation; and
   said fabric seam is further comprised of stitching, said stitching progressively increasing in the number of connecting threads per given length of seam, the lesser number of connecting threads per given length of seam being near said mounting point of said upper portion of said seat belt upon said first seat back frame.

* * * * *